United States Patent
Perkins et al.

(10) Patent No.: US 10,603,237 B2
(45) Date of Patent: Mar. 31, 2020

(54) LOCKING FASTENERS AND DEVICES AND METHODS FOR MAKING SAME

(71) Applicant: Matthews International Corporation, Pittsburgh, PA (US)

(72) Inventors: Corey Perkins, York, PA (US); Brian Kendig, York, PA (US); Tad Smith, York, PA (US); Yves Allard, Hellam, PA (US)

(73) Assignee: Matthews International Corporation, Pittsburgh, PA (US)

( * ) Notice: Subject to any disclaimer, the term of this patent is extended or adjusted under 35 U.S.C. 154(b) by 375 days.

(21) Appl. No.: 15/286,028

(22) Filed: Oct. 5, 2016

(65) Prior Publication Data
US 2017/0095389 A1  Apr. 6, 2017

Related U.S. Application Data

(60) Provisional application No. 62/237,804, filed on Oct. 6, 2015.

(51) Int. Cl.
| | |
|---|---|
| *A61G 17/04* | (2006.01) |
| *F16B 21/12* | (2006.01) |
| *F16B 12/24* | (2006.01) |
| *A61G 17/007* | (2006.01) |
| *F16B 21/04* | (2006.01) |
| *F16B 21/02* | (2006.01) |
| *F16B 21/16* | (2006.01) |

(52) U.S. Cl.
CPC ........... *A61G 17/04* (2013.01); *A61G 17/007* (2013.01); *A61G 17/0106* (2017.05); *F16B 12/24* (2013.01); *F16B 21/12* (2013.01); *F16B 21/02* (2013.01); *F16B 21/04* (2013.01); *F16B 21/16* (2013.01)

(58) Field of Classification Search
CPC .. A61G 17/04; A61G 17/0106; A61G 17/007; A61G 17/0405; F16B 12/24; F16B 21/12; F16B 21/02; F16B 21/04; F16B 21/16; F16B 5/10; E05B 65/0057; B27M 3/28; B27C 5/02
USPC ....... 27/2, 5, 17, DIG. 1; 411/555, 905, 356; 292/153, 240, 304, DIG. 11; 144/12, 144/134.1
See application file for complete search history.

(56) References Cited

U.S. PATENT DOCUMENTS

| 187,883 | A | * | 2/1877 | McCarthy | ................. | E05C 5/04 |
| | | | | | | 292/251 |
| 299,140 | A | * | 5/1884 | Hill | ......................... | E05B 63/20 |
| | | | | | | 292/334 |
| 322,471 | A | * | 7/1885 | Otto | .................... | E05B 65/0864 |
| | | | | | | 292/57 |
| 896,495 | A | * | 8/1908 | Wentz | ................. | E05B 65/0864 |
| | | | | | | 292/175 |
| 1,685,572 | A | * | 9/1928 | Onsrud | ..................... | B27C 7/00 |
| | | | | | | 144/144.1 |

(Continued)

*Primary Examiner* — William L Miller
(74) *Attorney, Agent, or Firm* — Pepper Hamilton LLP

(57) ABSTRACT

A locking fastener may include a head and a shaft with a pin interface configured to engage a pin for locking the locking fastener in place. Such locking fasteners may be used to connect a plurality of casket components, and are especially useful for wooden caskets. Methods of making such locking fasteners using a fastener finishing device are also described herein.

10 Claims, 9 Drawing Sheets

(56) References Cited

U.S. PATENT DOCUMENTS

| | | | | | |
|---|---|---|---|---|---|
| 2,580,666 | A | * | 1/1952 | Dzus | F16B 5/10 |
| | | | | | 411/555 |
| 2,688,894 | A | * | 9/1954 | Modrey | F16B 5/10 |
| | | | | | 411/34 |
| 4,131,376 | A | * | 12/1978 | Busse | F16B 12/2036 |
| | | | | | 312/263 |
| 4,653,970 | A | * | 3/1987 | Ballantyne | F16B 5/10 |
| | | | | | 29/432 |
| 6,116,663 | A | * | 9/2000 | Robert | A61G 17/02 |
| | | | | | 27/DIG. 1 |
| 6,152,499 | A | * | 11/2000 | Robert | A61G 17/02 |
| | | | | | 27/DIG. 1 |
| 6,364,377 | B1 | * | 4/2002 | Ferguson | A61G 17/02 |
| | | | | | 27/DIG. 1 |
| 2007/0196196 | A1 | * | 8/2007 | Schorling | F16B 21/04 |
| | | | | | 411/555 |

* cited by examiner

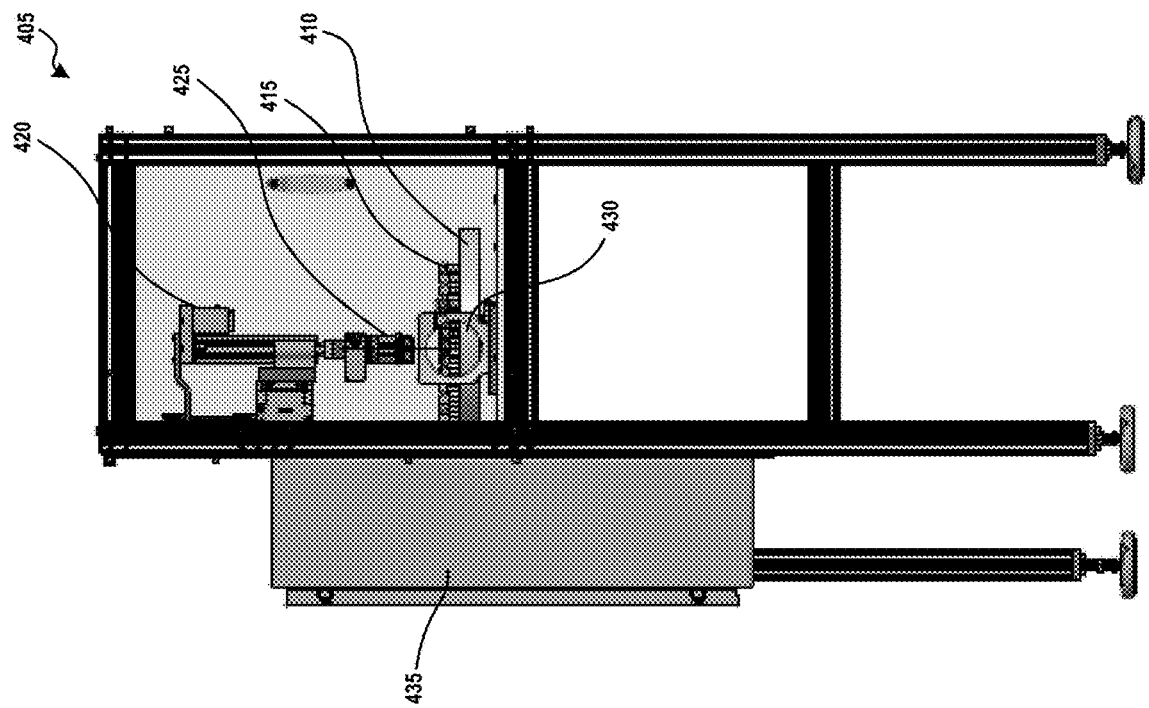
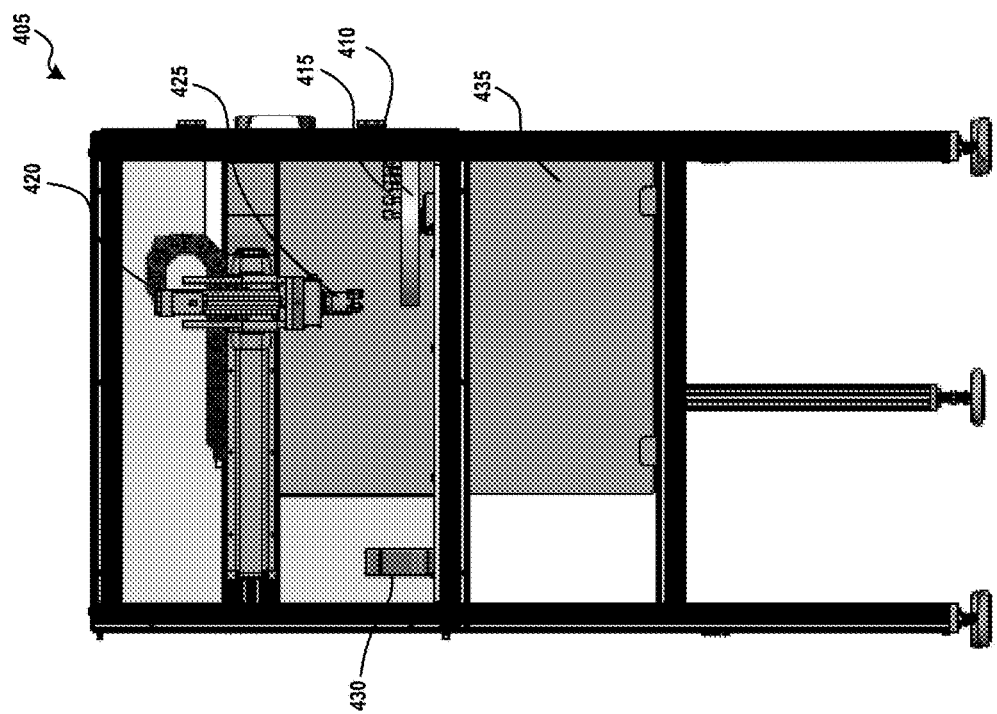
FIG. 4B
FIG. 4A

LOCKING FASTENERS AND DEVICES AND METHODS FOR MAKING SAME

CROSS REFERENCE TO RELATED APPLICATIONS

This application claims the benefit of priority to U.S. Provisional Application No. 62/237,804, filed on Oct. 6, 2015 and titled "Locking Fasteners and Devices and Methods for Making Same," the disclosure of which is incorporated by reference in its entirety.

BACKGROUND

Fasteners used to join two materials together are generally selected according to the particular application to achieve a minimum level of effectiveness. For example, metal screws and nails are generally used to connect two pieces of wood. For outdoor applications, metal screws that are coated with a polymer configured to inhibit the formation of rust may be selected. In furniture applications, metal cam lock nuts and cam screws are often used for affixing adjoining components.

In certain situations, desirable fastener characteristics may be determined by other factors besides effectiveness. For instance, it may be necessary for certain products to be made entirely out of biodegradable products, such as wood. In another instance, caskets made to conform with certain religious faiths or practices, such as Judaism, may not use certain materials, such as metal fasteners. For such products, manufacturers have attempted to use wooden fasteners. However, conventional wooden fasteners often fail, particularly in applications where the fasteners are required to support a substantial weight, such as a wooden casket application. In addition, typical wooden fasteners are often formed as wooden dowels, which can slip out of position if adhesives are not used. Accordingly, manufacturers would benefit from wooden fasteners configured to be effective in a wide range of applications and that remain in position without the use of metal components or adhesives.

SUMMARY

Embodiments herein are directed to a locking fastener having a head; and a shaft with a pin interface disposed therein. The pin interface may be configured to engage a pin for locking the locking fastener in place within a material. In some embodiments, the locking fasteners are wooden.

Some embodiments are directed to a wooden casket having a plurality of wooden locking fasteners configured to connect a plurality of casket components. Each of the plurality of wooden locking fasteners may comprise a head, and a shaft having a pin interface disposed therein. In some embodiments, the pin interface is configured to engage a pin for locking the locking fastener in place within at least one of the plurality of casket components.

Some embodiments are also directed to a fastener finishing device configured to generate a locking fastener. In some embodiments, the fastener finishing device may comprise a table configured to hold a plurality of locking fastener blanks; an interface component configured to modify a surface of each of the plurality of locking fastener blanks; an arm assembly comprising a clamp component configured to grasp one of the plurality of locking fastener blanks, and a control component operably coupled to the arm assembly to control the arm assembly to pick up the one of the plurality of locking fastener blanks from the table and to move the one of the plurality of locking fastener blanks with respect to the interface component such that the interface component forms a pin interface in a shaft of the one of the plurality of locking fastener blanks to form the locking fastener.

Some embodiments are directed to a method of adjoining two or more components of a casket comprising aligning an opening disposed within each of the two or more components to form a cavity; placing a locking fastener, comprising a head and a shaft having a pin interface disposed therein, into the cavity such that an open bottom portion of the pin interface is facing a pin opening; and inserting the pin through the pin opening to engage the open bottom portion of the pin interface to lock the locking fastener in place, thereby adjoining the two or more components of the casket. The components of the casket may be selected from a side wall, an end, a cover, a cap, or a combination thereof. The method may further comprise rotating the locking fastener to cause the pin to move within the pin interface in a direction toward the head, thereby drawing the locking fastener toward the material.

BRIEF DESCRIPTION OF THE DRAWINGS

The above and other objects of the present invention will become more readily apparent from the following detailed description taken in connection with the accompanying drawings.

FIGS. 4A-4D depict an illustrative fastener finishing device according to some embodiments.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The described technology generally relates to fasteners configured to be affixed or "locked" into a position ("locking fasteners") via engagement with a corresponding pin or surface projection ("pin") and devices for making or finishing such locking fasteners. In general, the locking fasteners may include an interface configured to engage a pin to lock the locking fastener in place. In some embodiments, the fasteners may be formed from or substantially from wood. In some embodiments, the fasteners may be configured to permanently or semi-permanently connect two materials. For instance, locking fasteners configured according to some embodiments may be used to permanently or semi-permanently connect two pieces of wood.

Although lockable fasteners formed from wood are used as examples herein, embodiments are not so limited. For examples, the lockable fasteners may be formed from metal, plastic, non-wood biodegradable materials (e.g., polylactic acid), wood, or combinations thereof. Non-limiting types of wood for the lockable fasteners described herein include pine, oak, maple, cedar, beech, elm, walnut, reclaimed wood, or combinations thereof. Non-limiting types of metal include aluminum, steel, stainless steel, copper, or combinations thereof.

Figure 1A:
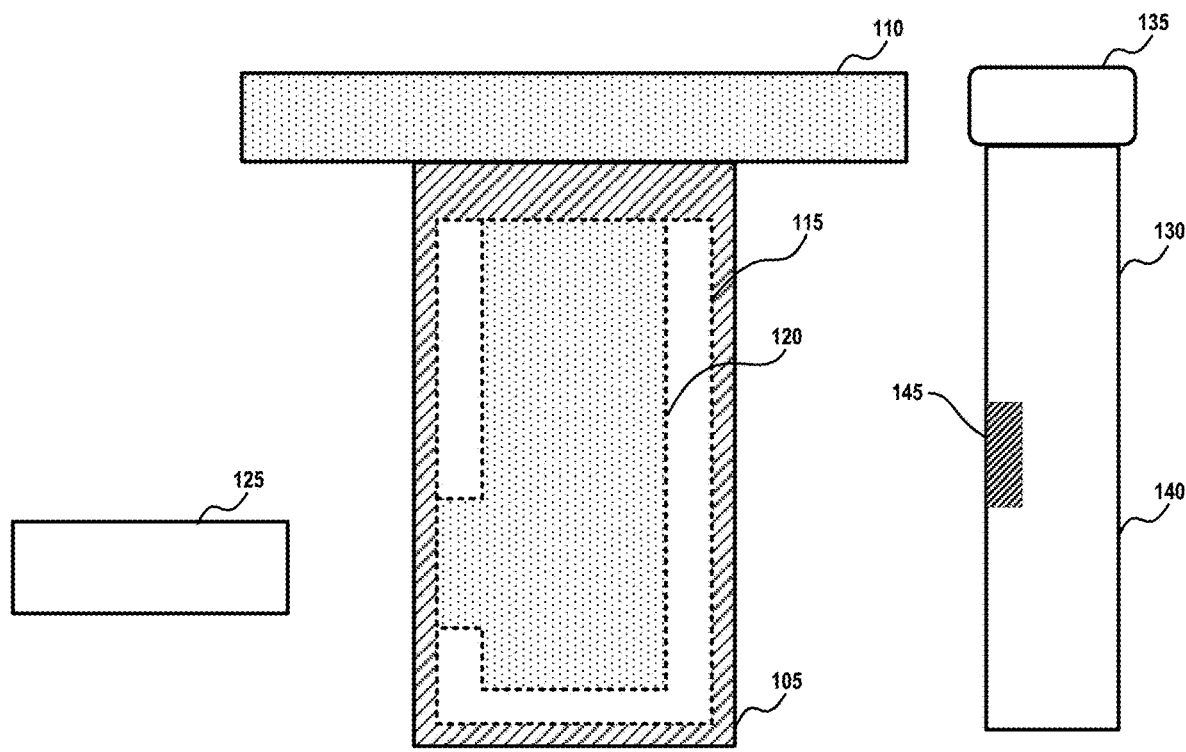
FIGS. 1A and 1B depict an illustrative locking fastener according to a first embodiment.
Figure 1B:
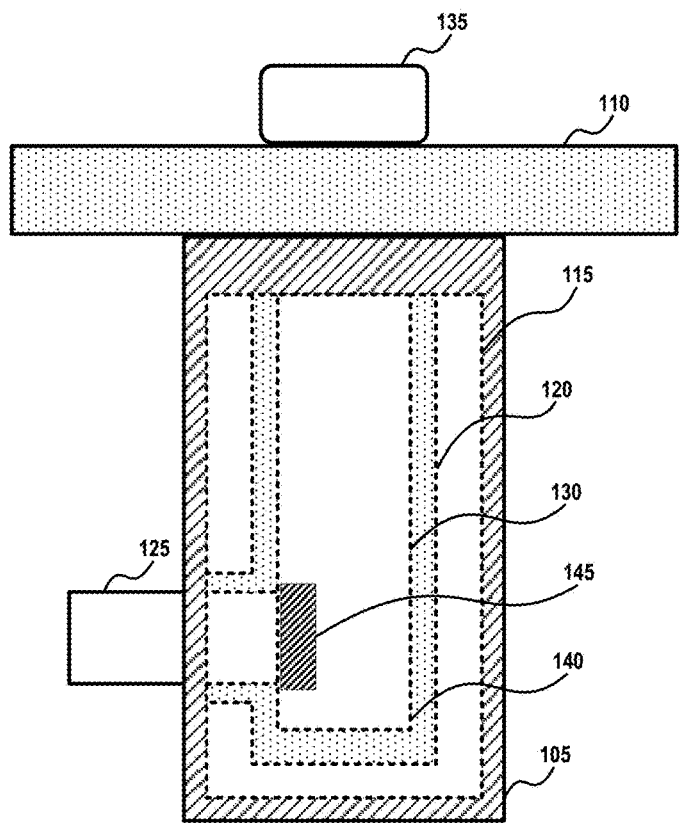

FIGS. 1A and 1B depict an illustrative locking fastener according to some embodiments. As shown in FIG. 1A, a locking fastener 130 may generally be in the form of a dowel having a head 135 and a shaft 140. The shaft 140 may include a pin interface 145 configured to be engaged by a pin 125. A first material 105, as shown through cut-out 115, may include a cavity or bore 120 configured to receive at least a portion of the locking fastener 130 and the pin 125. Cut-out 115 is not an actual element of the first material 105, but is depicted in FIGS. 1A and 1B to allow for the visualization of an inner portion of the first material. As shown in FIG. 1B, the locking dowel 130 may be inserted through an opening (not shown) in a second material 110 into the cavity 120. In some embodiments, the opening may have a diameter that is smaller than a diameter of the head 135 such that the head cannot fit through the opening. In some embodiments, the opening may have a diameter that is larger than a diameter of the head 135 such that the head may fit through the opening. The pin 125 may be pushed into the cavity 120 to engage the pin interface 145 to lock the locking fastener 130 in place. In some embodiments, the locking fastener 130 may be rotated or otherwise moved in order to effectuate the engagement of the locking fastener with the pin 125.

When the locking fastener 130 is locked in place, the head 135 may hold the second material 110 in place, thereby affixing the second material 110 to the first material 105, for example, in a manner substantially similar to a metal screw used according to conventional processes known to those having ordinary skill in the art. In particular, the locking fastener 130 may be locked into position and may not be unintentionally removed.

In some embodiments, the pin 125 may not be a separate component. For example, the pin 125 may be configured as a projection within the cavity 120. In some embodiments, the locking fastener 130 may not be in the form of a dowel. For instance, the locking fastener 130 may be formed as a screw, nail, or other fastener. In such an embodiment, the locking fastener 130 may penetrate a material, such as the first material 105 and/or the second material 110 without requiring pre-formed openings and/or cavities 120 therein.

The locking fastener 130 may be used in various applications. In some embodiments, locking fasteners 130 may be used as fasteners to adjoin the components of a casket, such as a wooden casket. For instance, locking fasteners 130 may be used to adjoin the side walls, ends, covers, caps, or the like of a wooden casket. In some embodiments, locking fasteners 130 may be used as the sole form of fastener for a wooden casket made to conform with the customs of Orthodox Judaism that require the use of biodegradable materials.

The locking fastener 130 and portions thereof, including the head 135 and the shaft 140, may have cross-sections of various shapes, including cylindrical, square, rectangular, circular, elliptical, or the like. The locking fastener 130 may have a length of about 0.25 inches, about 0.5 inches, about 1 inch, about 2 inches, about 3 inches, about 4 inches, about 5 inches, about 6 inches, about 7 inches, about 8 inches, about 9 inches, about 10 inches, or any value or range between any two of these values (including endpoints). The head 130 may have a width (or a diameter if circular or elliptical) of about 0.125 inches, about 0.25 inches, about 0.5 inches, about 0.75 inches, about 1 inch, about 2 inches, about 3 inches, or any value or range between any two of these values (including endpoints). The shaft 140 may have a width (or a diameter if circular or elliptical) of about 0.125 inches, about 0.25 inches, about 0.5 inches, about 0.75 inches, about 1 inch, about 2 inches, about 3 inches, or any value or range between any two of these values (including endpoints).

FIGS. 2A-2E depict various views of an illustrative locking fastener according to a second embodiment. As shown in FIGS. 2A-2E, a locking fastener 230 may include a head 235 and a shaft 240 having a pin interface 245 disposed therein. The pin interface 245 may be formed as a groove or slot disposed within a portion of the shaft 240. For example, the pin interface 245 may be formed as a trough-shaped groove that winds around a portion of the shaft 240. The groove of the pin interface 245 may have a depth within the shaft 240 of about 0.125 inches, about 0.25 inches, about 0.5 inches, about 0.75 inches, about 1 inch, about 2 inches, about 3 inches, or any value or range between any two of these values (including endpoints). The groove of the pin interface 245 may extend up from a bottom of the shaft 240 by about 0.125 inches, about 0.25 inches, about 0.5 inches, about 0.75 inches, about 1 inch, about 2 inches, about 3 inches, or any value or range between any two of these values (including endpoints).

Figure 2A:
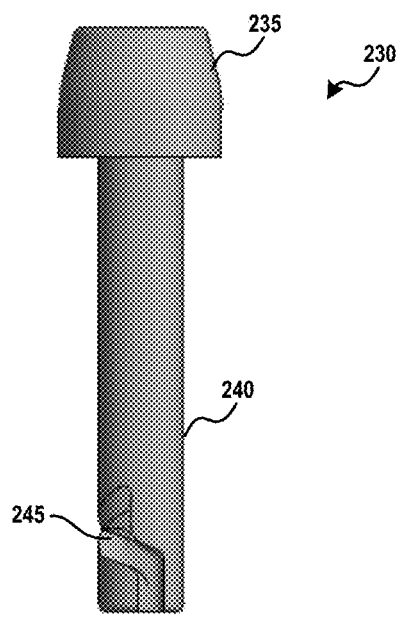
FIGS. 2A-2E depict an illustrative locking fastener according to a second embodiment.
Figure 2B:
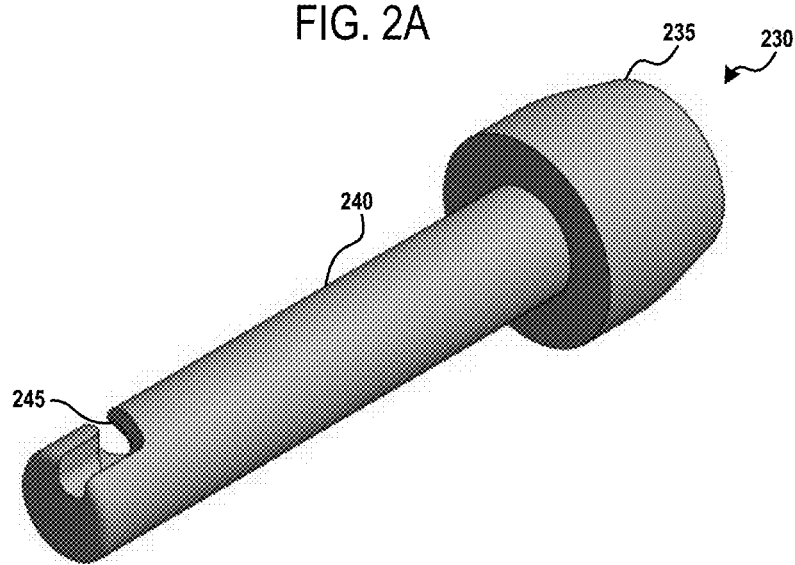
Figure 2C:
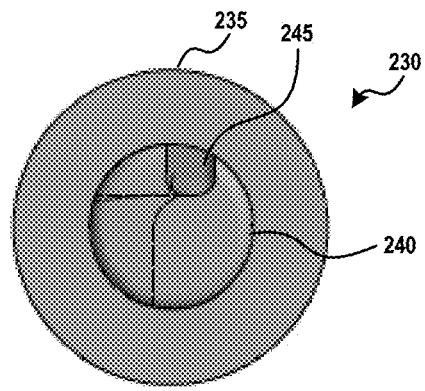
Figure 2E:
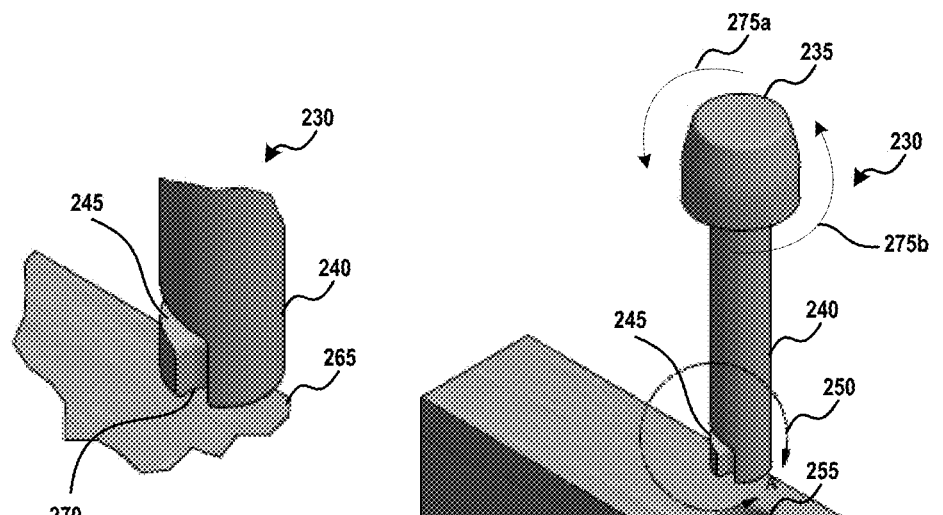
Figure 2D:
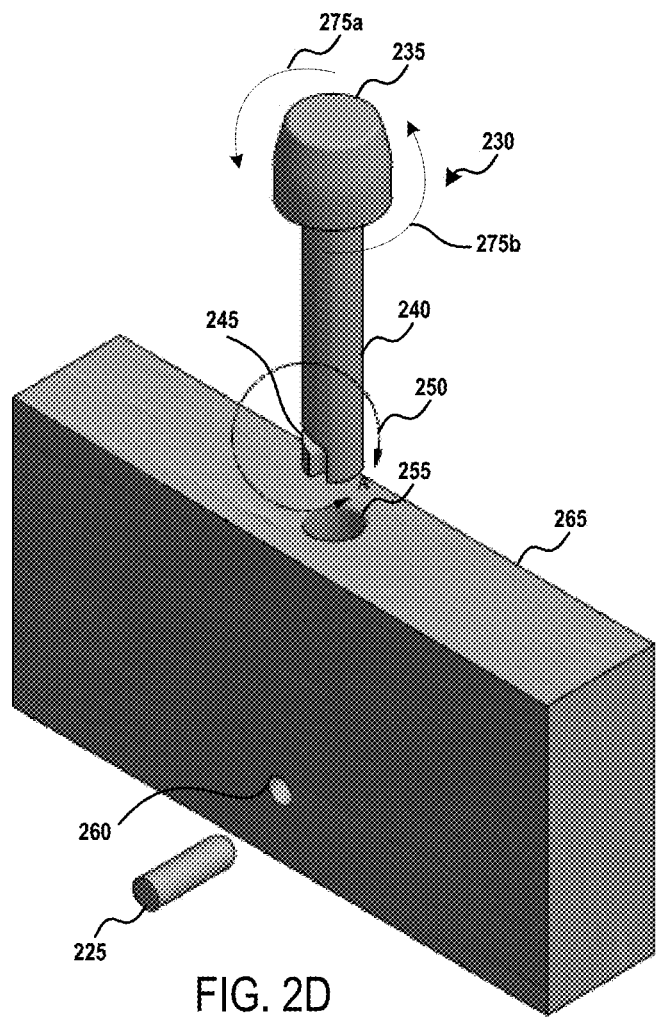

Referring to FIG. 2E, which depicts detail 250 of FIG. 2D, the pin interface 245 may include an open bottom portion 270. As shown in FIG. 2D, the locking fastener 230 may be placed into a fastener opening 255 in a material 265 and into a bore or cavity (not shown) disposed therein. The locking fastener 230 may be placed into the cavity such that the open bottom portion 270 of the pin interface 245 is facing a pin opening 260. When the locking fastener 230 has been arranged in the cavity such that the open bottom portion 270 is facing the pin opening 260, the pin 225 may be inserted into the open bottom portion. The locking fastener 230 may be rotated, for example, in a direction indicated by lines 275a, 275b to cause the pin 225 to move within the pin interface 245 in a direction toward the head 235, thereby drawing the locking fastener 230 toward the material 265 and locking the locking fastener in place.

FIGS. 3A-3E depict various views of an illustrative locking fastener according to a third embodiment. As shown in FIGS. 3A-3E, a locking fastener 330 may include a head 335 and a shaft 340 having a pin interface 345 disposed therein. The pin interface 345 may be formed as a recessed groove or slot disposed around an outer circumference of the shaft 340, forming a lower shoulder 370a and an upper shoulder 370b. The groove of the pin interface 345 may have a depth within the shaft 340 of about 0.125 inches, about 0.25 inches, about 0.5 inches, about 0.75 inches, about 1 inch, about 2 inches, about 3 inches, or any value or range between any two of these values (including endpoints). The groove of the pin interface 345 may be located at various distances from the bottom of the shaft 340, such as about 0.125 inches, about 0.25 inches, about 0.5 inches, about 0.75 inches, about 1 inch, about 2 inches, about 3 inches, or any value or range between any two of these values (including endpoints) from the bottom of the shaft.

Figure 3A:
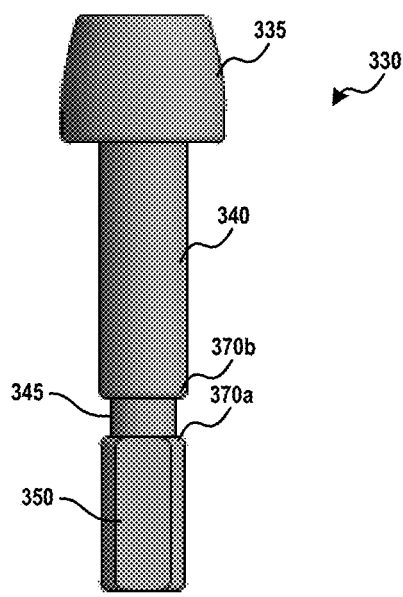
FIGS. 3A-3E depict an illustrative locking fastener according to a third embodiment.
Figure 3B:
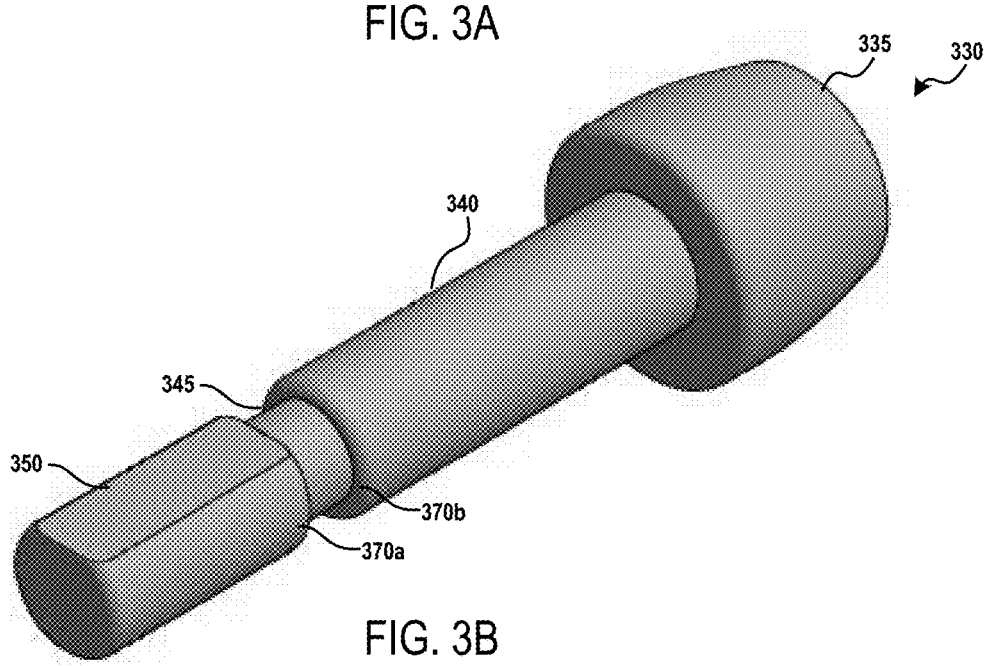
Figure 3C:
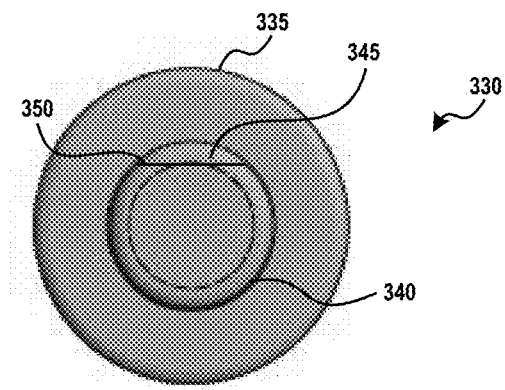
Figure 3E:
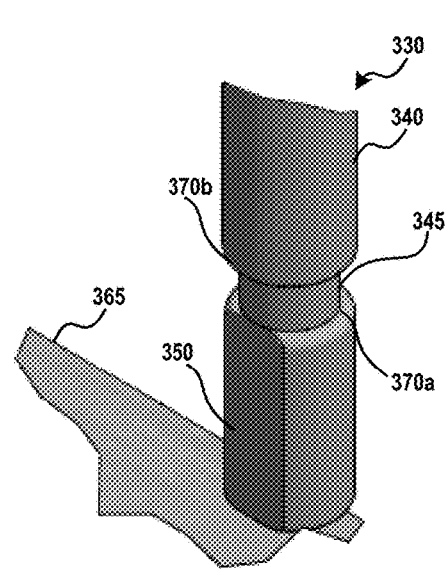
Figure 3D:
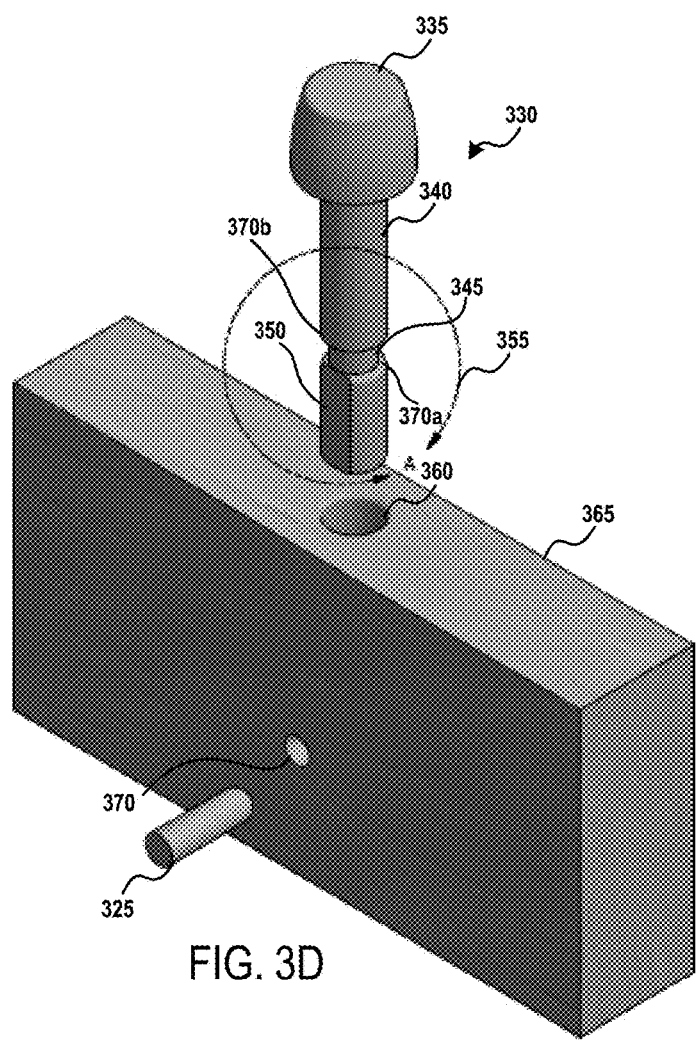
Figure 4D:
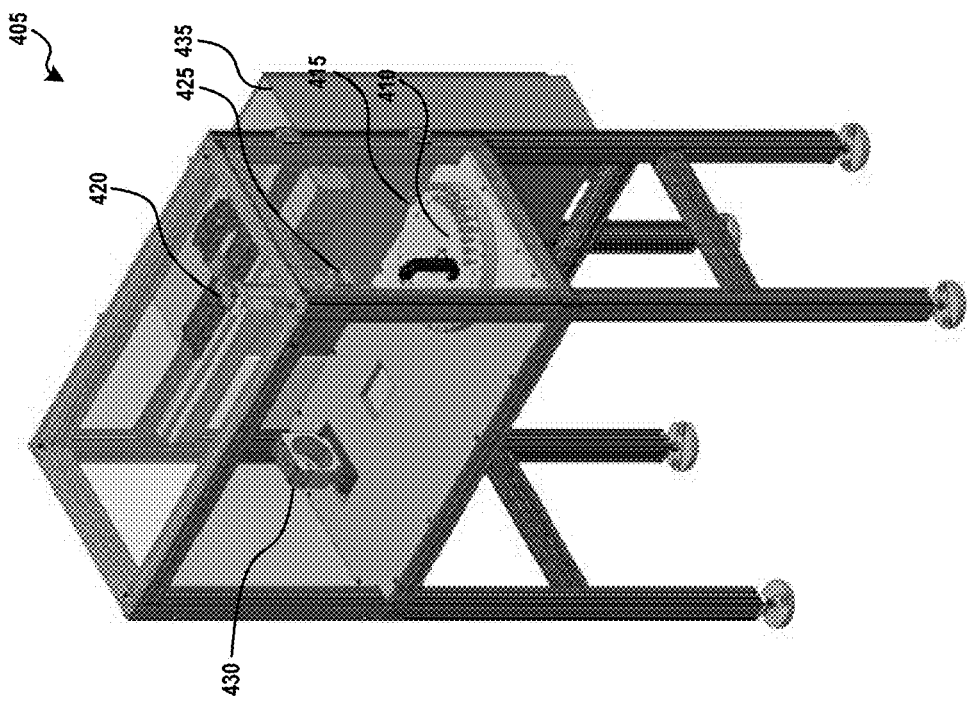
Figure 4C:
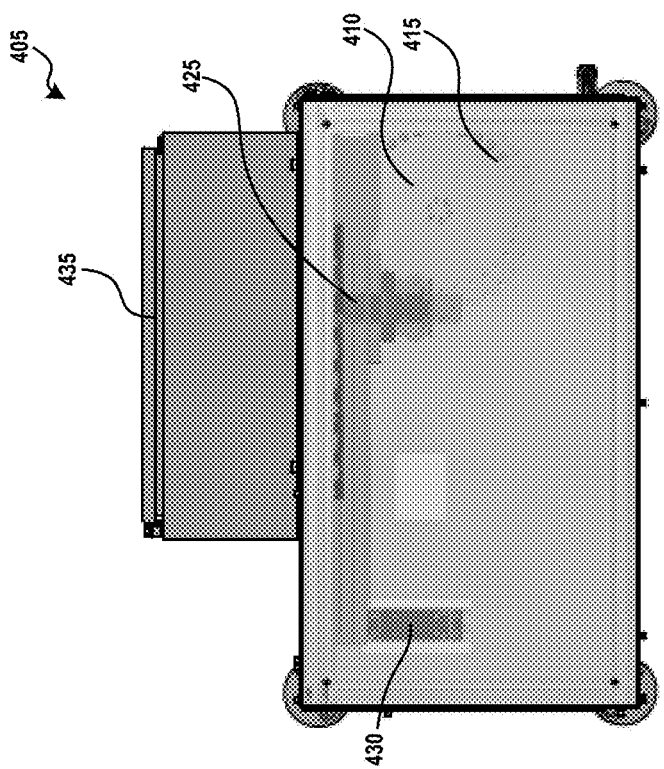

A portion of the shaft 340 located below (or "distal to") the pin interface 345 may be formed as a flat surface 350. In some embodiments, the lower shoulder 370a is not formed where the flat surface 350 meets the pin interface. As shown in FIG. 3D, the locking fastener 330 may be placed into a fastener opening 355 in a material 365 and into a bore or cavity (not shown) disposed therein. The locking fastener 330 may be placed into the cavity such that the flat portion 350 of the pin interface 345 is facing a pin opening 360.

When the locking fastener 330 has been arranged in the cavity such that the flat portion 350 is facing the pin opening 360, the pin 325 may be inserted into the open bottom portion. The bore may be configured such that the pin interface 345 may be arranged in an area adjacent to the pin opening 360. For example, the flat portion 350 of the locking pin 330 may be located below the pin opening 360 and the pin interface 345 may be level or substantially level with the pin opening. When the locking fastener 330 is located in the bore such that the pin interface 345 is arranged in an area adjacent to the pin opening 360, the pin 325 may be inserted into the pin opening to engage the pin interface. The locking pin 330 may be rotated such that the pin 325 is located between the lower shoulder 370a and the upper shoulder 370b. For example, the locking pin 330 may be rotated such that the flat surface 350 faces away or substantially away from the pin opening 360. The lower shoulder 370a may engage the pin 325 to prevent movement of the locking pin 330 out of the bore, and the upper shoulder 370b may engage the pin to prevent movement of the locking pin further into the bore. In this manner, the locking pin 330 may be locked in position in the material 365.

FIGS. 4A-4D depict various views of an illustrative fastener finishing device according to some embodiments. As shown in FIGS. 4A-4D, a fastener finishing device 405 may be configured to generate locking fasteners by forming certain aspects ("finish") in locking fastener blanks 415 (for instance, locking fasteners lacking pin interfaces). Although multiple locking fastener blanks 415 are depicted in FIGS. 4A-4D, only one has been labelled to simplify the figure. In some embodiments, the fastener finishing device 405 may be configured to finish the locking fastener blanks 415 by generating the pin interfaces to generate locking fasteners. In some embodiments, the fastener blanks 415 lacking a pin interface may be arranged on a table 410 configured to hold each individual locking fastener. For instance, the table 410 may include holes configured to receive a portion of a locking fastener, such as the shaft of a locking fastener. In some embodiments, the table 410 may be configured to move, for instance, by rotating about a central axis.

Figure 5C:
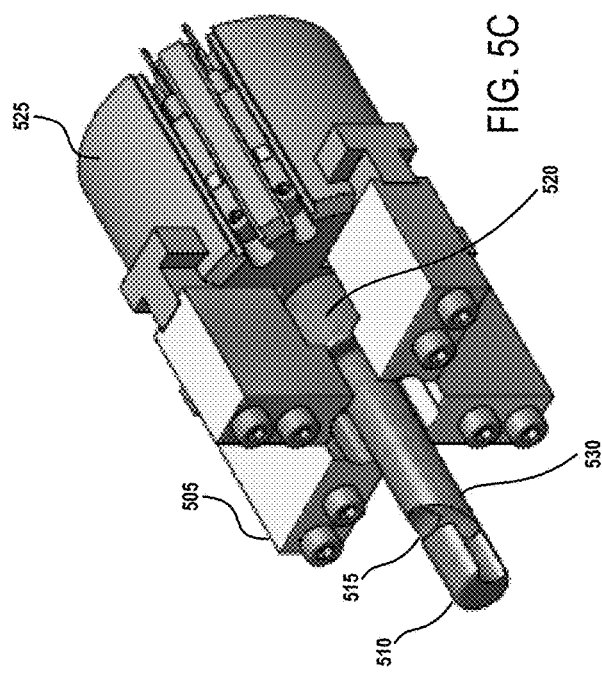
FIGS. 5A-5C depict an illustrative fastener finishing device clamp component according to some embodiments.
Figure 5A:
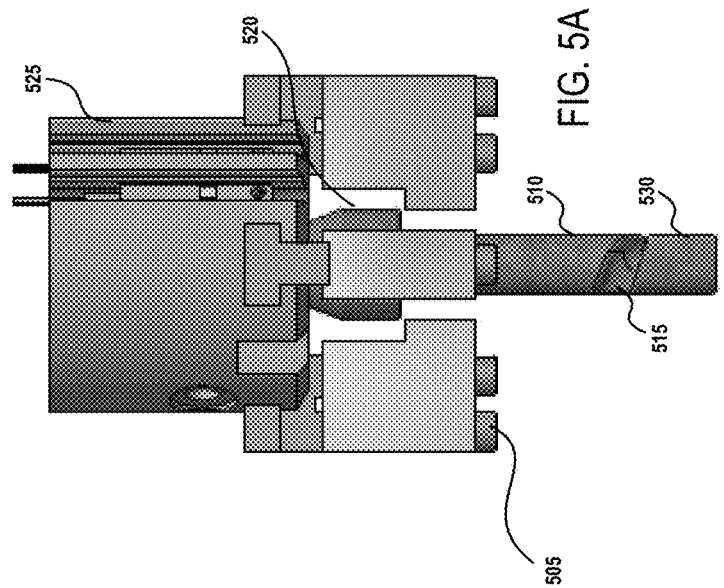
Figure 5B:
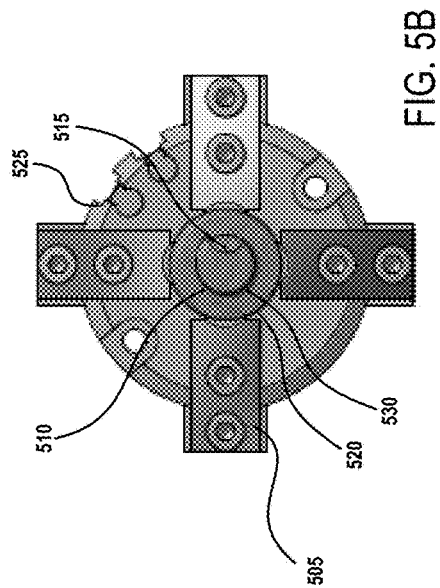

The fastener finishing device 405 may include an arm assembly 420 having a clamp component 425 configured to grasp and hold a locking fastener blank 415 (see FIGS. 5A-5C that depict an illustrative fastener finishing device clamp component according to some embodiments). The arm assembly 420 may be operably coupled to a control component 435 configured to operate or otherwise control the arm assembly. In some embodiments, the control component 435 may include a logic device which may generally include a processor, a non-transitory memory or other storage device for housing programming instructions, data or information regarding one or more applications, and other hardware, including, for example, the central processing unit (CPU) 605, read only memory (ROM) 610, random access memory (RAM) 615, communication ports 640, controller 620, and/or memory device 625 depicted in FIG. 6 and described below in reference thereto. In some embodiments, the control component 435 may include a programmable logic controller (PLC) and associated hardware and software for controlling the arm assembly 420. In some embodiments, the control component 435 may be configured as a PLC control system.

The control component 435 may be configured to move the arm assembly 420 and/or components thereof through the control of one or more devices operably coupled to the arm assembly, such as a servo motor, a stepper motor, a hydraulic element, or the like. The arm assembly 420 may be configured to pick up a locking fastener blank 415 from the table 410 and to move the locking fastener to an interface component 430 for cutting the pin interface into the locking fastener. In some embodiments, the interface component 430 may be configured to cut, carve, grind, route, scrape, sand, or otherwise modify a surface of the locking fastener blank 415 to generate a pin interface. In some embodiments, the interface component 430 may include a routing tool. In some embodiments, the interface component 430 may include a sander, a saw, a grinder, a rotary tool, or the like. In some embodiments, the control component 435 may be operably coupled to the interface component 430 in order to control the interface component. For instance, the control component 435 may be configured to power on/off the interface component 430 and/or to change the speed, angle, location, or any other operational aspect of the interface component. In some embodiments, the control component 435 may be configured to control the arm assembly 420 and/or the interface component to cut the pin interface into each locking fastener blank 415. For example, the control component 435 may control the arm assembly 420 to move a locking fastener blank 415 with respect to the interface component 430 such that the interface component cuts a pin interface into the locking fastener. In some embodiments, the control component 435 may be configured to control components of the fastener finishing device 405 according to a programming instructions developed or configured by an operator. For instance, the programming instructions may include instructions for moving a locking fastener blank 415 being held by the arm assembly 420 such that the interface component 430 may cut the pin interface into the locking fastener blank, such as pin interface 245 to generate a locking fastener.

FIGS. 5A-5C depict various views of an illustrative fastener finishing device clamp component according to some embodiments. As shown, in FIGS. 5A-5C, clamp component 525 may include fingers 505 configured to grasp a locking fastener blank 510. Although multiple fingers 505 are depicted in FIGS. 5A-5C, only one has been labelled to simplify the figure. In some embodiments, the fingers 505 may be configured to grasp the locking fastener 510 by the head 520 and/or the shaft 530. In some embodiments, a control component, such as control component 435, may be configured to control an arm assembly, such as arm assembly 420, and/or the clamp component 525 to move the locking fastener blank 510 with respect to an interface component, such as interface component 430. In this manner, the interface component may generate a pin interface 515 in the shaft 530 of a locking fastener 510 to generate a locking fastener according to some embodiments described herein.

Figure 6:
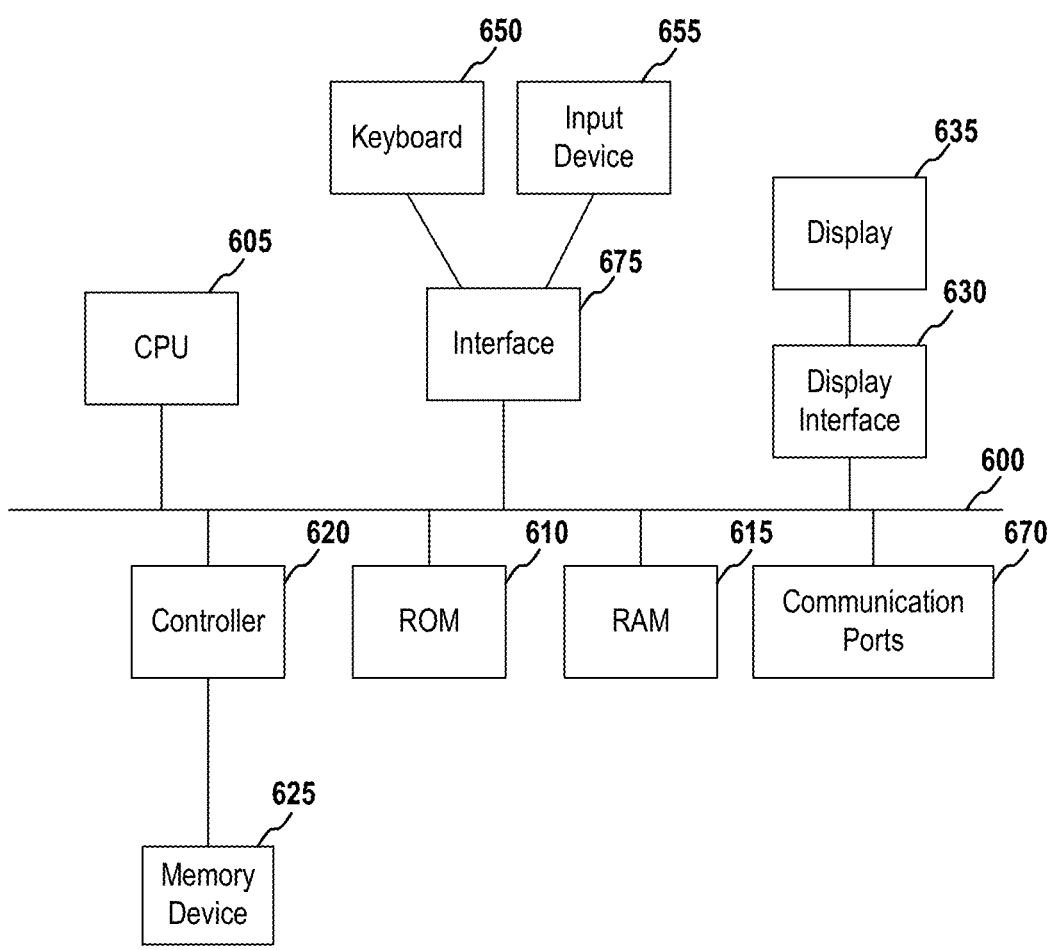
FIG. 6 illustrates various embodiments of a computing device for implementing the various methods and processes described herein.

FIG. 6 depicts a block diagram of exemplary internal hardware that may be used to contain or implement the various computer processes and systems as discussed above. In some embodiments, the exemplary internal hardware may include or may be formed as part of a PLC control system. A bus 600 serves as the main information highway interconnecting the other illustrated components of the hardware.

CPU 605 is the central processing unit of the system, performing calculations and logic operations required to execute a program. CPU 605 is an exemplary processing device, computing device or processor as such terms are used within this disclosure. Read only memory (ROM) 630 and random access memory (RAM) 635 constitute exemplary memory devices.

A controller 620 interfaces with one or more optional memory devices 625 via the system bus 600. These memory devices 625 may include, for example, an external or internal DVD drive, a CD ROM drive, a hard drive, flash memory, a USB drive or the like. As indicated previously, these various drives and controllers are optional devices. Additionally, the memory devices 625 may be configured to include individual files for storing any software modules or instructions, data, common files, or one or more databases for storing data.

Program instructions, software or interactive modules for performing any of the functional steps associated with controlling the fastener finishing device 405, as described above, may be stored in the ROM 630 and/or the RAM 635. Optionally, the program instructions may be stored on a tangible computer-readable medium such as a compact disk, a digital disk, flash memory, a memory card, a USB drive, an optical disc storage medium, such as a Blu-Ray™ disc, and/or other recording medium.

An optional display interface 630 can permit information from the bus 600 to be displayed on the display 635 in audio, visual, graphic or alphanumeric format. Communication with external devices may occur using various communication ports 640. An exemplary communication port 640 may be attached to a communications network, such as the Internet or a local area network.

The hardware may also include an interface 645 which allows for receipt of data from input devices such as a keyboard 650 or other input device 655 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the embodiments described above.

The invention claimed is:

1. A fastener finishing device configured to generate a locking fastener, the fastener finishing device comprising:
    a table configured to hold a plurality of locking fastener blanks;
    an interface component configured to modify a surface of each of the plurality of locking fastener blanks;
    an arm assembly comprising a clamp component configured to grasp one of the plurality of locking fastener blanks; and
    a control component operably coupled to the arm assembly to control the arm assembly to pick up the one of the plurality of locking fastener blanks from the table and to move the one of the plurality of locking fastener blanks with respect to the interface component such that the interface component forms a pin interface in a shaft of the one of the plurality of locking fastener blanks to form the locking fastener.

2. The fastener finishing device according to claim 1, wherein the pin interface is configured as a groove extending around the shaft starting from a bottom of the shaft.

3. The fastener finishing device according to claim 1, wherein the pin interface is configured as a recessed groove disposed around an outer circumference of the shaft.

4. The fastener finishing device according to claim 3, further comprising a flat surface disposed on the shaft distal to the pin interface.

5. The fastener finishing device according to claim 1, wherein the locking fastener is formed from wood.

6. The fastener finishing device according to claim 1, wherein the pin interface is configured to engage a pin for locking the locking fastener in place within a casket component.

7. The fastener finishing device according to claim 1, wherein the interface component modifies the surface of each of the plurality of locking fastener blanks to form the pin interface by cutting, carving, grinding, routing, scraping, sanding, or a combination thereof.

8. A method of adjoining two or more components of a casket, the method comprising:
    aligning an opening disposed within each of the two or more components to form a cavity;
    placing a locking fastener, comprising a head and a shaft having a pin interface disposed therein, into the cavity such that an open bottom portion of the pin interface is facing a pin opening; and
    inserting the pin through the pin opening to engage the open bottom portion of the pin interface to lock the locking fastener in place, thereby adjoining the two or more components of the casket.

9. The method of claim 8, wherein each of the two or more components of the casket may be selected from a side wall, an end, a cover, a cap, or a combination thereof.

10. The method of claim 8, further comprising rotating the locking fastener to cause the pin to move within the pin interface in a direction toward the head, thereby drawing the locking fastener toward one component of the two or more components of the casket.

* * * * *